United States Patent [19]
Kiiski

[11] Patent Number: 6,032,057
[45] Date of Patent: Feb. 29, 2000

[54] CELLULAR RADIO SYSTEM REPEATER AND BASE STATION

[75] Inventor: Matti Kiiski, Oulunsalo, Finland

[73] Assignee: Nokia Telecommunications Oy, Espoo, Finland

[21] Appl. No.: 08/700,406

[22] PCT Filed: Jan. 25, 1996

[86] PCT No.: PCT/FI96/00050

§ 371 Date: Sep. 25, 1996

§ 102(e) Date: Sep. 25, 1996

[87] PCT Pub. No.: WO96/23370

PCT Pub. Date: Aug. 1, 1996

[30] Foreign Application Priority Data

Jan. 26, 1995 [FI] Finland ................................. 950351

[51] Int. Cl.⁷ .................................................. H04B 1/38

[52] U.S. Cl. ........................ 455/562; 455/465; 455/523; 348/8; 348/13

[58] Field of Search .................................. 455/402, 462, 455/465, 562, 561, 523, 66, 14, 11, 20, 22, 69, 67.4, FOR 116; 348/12, 13, 8

[56] References Cited

U.S. PATENT DOCUMENTS

| | | | |
|---|---|---|---|
| 5,204,970 | 4/1993 | Stengel et al. | 455/69 |
| 5,408,679 | 4/1995 | Masuda | 455/11.1 |
| 5,574,981 | 11/1996 | Ahonen | 455/67.4 |
| 5,592,540 | 1/1997 | Beveridge | 348/8 |

*Primary Examiner*—Reinhard J. Eisenzopf
*Assistant Examiner*—Darnell R. Armstrong
*Attorney, Agent, or Firm*—Pillsbury Madison & Sutro LLP

[57] ABSTRACT

The coverage area of the base station of a cellular radio system is expanded in a very simple and easily implementable way by utilizing the cabling present in a community antenna system, so that the community antenna system and a repeater connected thereto are used for transmitting telecommunication signals between the base station and a subscriber unit served by the system. The base station can also transmit on the control channel to the repeater information as to which radio channel and which power level the repeater should at each time repeat the signals it receives, to ensure that the signals intended for a specific subscriber unit are repeated on a traffic channel and power level suitable for the purpose. The base station can reduce the power level used by the repeater to such a level that a plurality of repeaters utilizing the same traffic channel can be placed close to one another without disturbing one another.

7 Claims, 2 Drawing Sheets

CELLULAR RADIO SYSTEM REPEATER AND BASE STATION

BACKGROUND OF THE INVENTION

The present invention relates to a cellular radio system which comprises: subscriber units, a base station comprising means for establishing a telecommunication connection to the subscriber units of the system, whereby a transmitter of the base station comprises means for supplying telecommunication signals to a community antenna system, and a receiver of the base station comprises means for receiving telecommunication signals transmitted from the community antenna system, and a repeater which comprises a connection unit for connecting the repeater to the community antenna system, and an antenna means for establishing a telecommunication connection to the subscriber unit by radio frequency signals, whereby the repeater is arranged to transmit telecommunication signals between the subscriber unit and the community antenna system. The invention further relates to a repeater for repeating telecommunication signals between a base station of a cellular radio system and a subscriber unit which repeater comprises: a connection unit which comprises means for connecting the repeater to a community antenna system having a signal transmission connection to the base station; an antenna means having a signal transmission connection to the subscriber unit on radio frequency signals; and signal processing means including a first signal processing branch for transferring the signals transmitted by the community antenna system to the radio frequency and for supplying the radio frequency signals via the antenna means to the subscriber unit, and a second signal processing branch for transferring the radio frequency signals received from the antenna means to a predetermined transmission frequency and for supplying transmission frequency signals further via the connection unit to the community antenna system. The invention also relates to a base station of a cellular radio system which comprises a transmitter arranged to transmit communication signals via a community antenna system to subscriber units, a receiver arranged to receive telecommunication signals transmitted via the community antenna system from the subscriber units.

This invention relates to cellular radio systems, such as the GSM system (Groupe Spécial Mobile), and especially to improving the audibility of cellular radio systems in places where the audibility of the base station is weak, such as inside buildings.

There are prior art solutions in which the aim has been to improve the audibility of the cellular radio system inside buildings by arranging a base station inside a building. In addition to its cost, the most significant weakness of this solution is that it is usually very difficult to place a single base station in such a place that its audibility to different parts of the building would be good. Therefore, in most cases the base station can be heard well only in certain parts of the building, for example, on some floors, whereas in other parts of the building the audibility of the base station is very weak. The high cost of this prior art solution is in part caused by the fact that the base station equipment is expensive, in addition to which, the installation of the cabling of the base station inside a building, for example, for establishing a transmission connection between the base station and the base station controller, can cause problems and can become expensive.

SUMMARY OF THE INVENTION

The object of this invention is to solve the problem mentioned above and to provide a better solution than before by means of which the audibility of the cellular radio system can be significantly improved in places where the audibility of the base station is weak, such as inside a building, in a considerably less expensive and simple way than in the prior art solutions. This object is achieved with the cellular radio system according to the invention which is characterized in that the repeater comprises means for receiving a predetermined control signal from the base station, mixer means for transferring signals to be repeated supplied by the base station to a radio channel indicated by the control signal, and adjustment means for adjusting the signal level of the radio frequency signals to the level indicated by the control signal.

The expression the community antenna system refers in this context, for example, to a fixed antenna system transmitting TV and/or radio signals, such as a cable television system or a building-specific community antenna system in a multi-story building which includes flat-specific connections.

The invention is based on the idea that the coverage area of the base station of the cellular radio system can be expanded in a very simple and easily implementable way by utilizing the cabling present in the community antenna system so that the community antenna system and the repeater, to be connected thereto, are used for transmitting telecommunication signals between the base station and the subscriber unit. When the base station can also transmit on the control channel to the repeater, on which radio channel and on which power level the repeater should at each time repeat the signals it receives, it can be ensured that the signals intended for a specific subscriber unit are repeated on a traffic channel and a power level suitable for the purpose. Therefore, when required, the base station can reduce the power level used by the repeater to such a level that the repeaters utilizing the same traffic channel can be placed closer to one another than before without disturbing one another. The most significant advantages of the cellular radio system of the invention are thus that the audibility of the base station can be improved in any area covered by the community antenna system in which there is a connection to the community antenna system without requiring additional cabling and without needing to install a base station inside a building, wherefore the costs will be significantly lower.

The invention further relates to a repeater that can be utilized in the cellular radio system according to the invention. The repeater according to the invention is characterized in that the first signal processing branch comprises means for receiving a predetermined control signal from the base station through the connection unit, mixer means for transferring signals to be repeated received via the connection unit to a radio channel indicated by the control signal, and adjustment means for adjusting the signal level of the radio frequency signals to a level indicated by the control signal.

Since the repeater according to the invention comprises means for changing the frequency of the signals to be repeated, the signals between the base station and the repeater need not be on a radio frequency, but their frequency can be freely selected in accordance with the data transmission channel to be used.

In one preferred embodiment of the repeater according to the invention, the repeater comprises means for transmitting a control signal indicating the signal level of the received signal to the base station. Therefore, signals with a constant signal level can be used in the signal transmission between the repeater and the base station since the information needed for handover and the like operations about the signal level of the radio signals received from the subscriber unit can be transmitted to the base station on a separate control channel.

In another preferred embodiment of the repeater according to the invention, the repeater comprises means for producing a clock signal from the control signal transmitted from the base station, whereby the repeater will not need a clock of its own for producing the clock signal. Therefore, the price of the repeater will be lower and it is certain that the repeater is correctly synchronized in relation to the base station.

The invention also relates to a base station which can be utilized in the cellular radio system according to the invention. The base station according to the invention is characterized in that the transmitter comprises means for supplying a predetermined control signal to the community antenna system. The control signal indicates the radio channel and the transmission power on which the telecommunication signals transmitted by the transmitter should be transmitted via the radio path to the subscriber units.

BRIEF DESCRIPTION OF THE DRAWINGS

In the following, the invention will be explained in more detail by means of an example with reference to the accompanying figures, in which.

DETAILED DESCRIPTION

Figure 1:
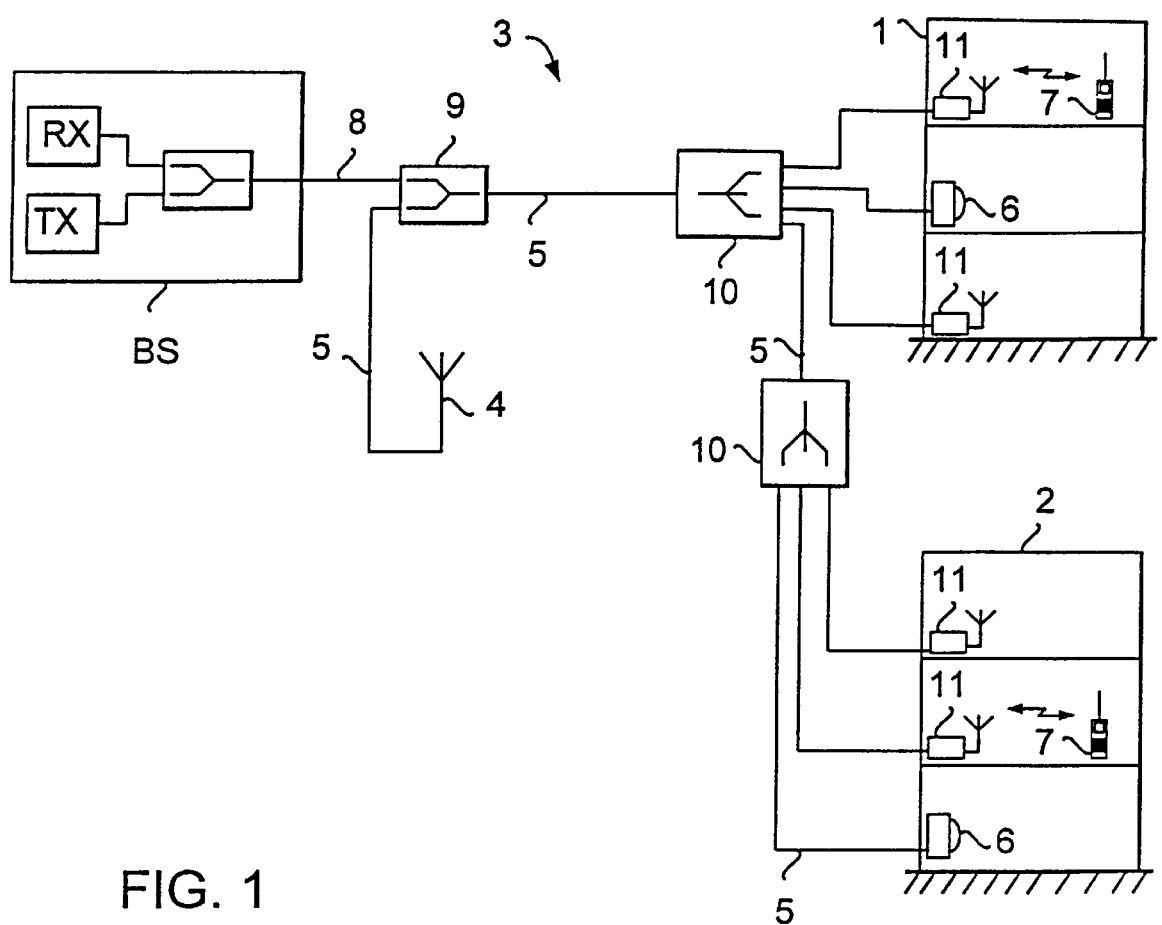
FIG. 1 shows a block diagram of a first preferred embodiment of the cellular radio system according to the invention.

FIG. 1 shows a block diagram of a first preferred embodiment of the cellular radio system according to the invention. FIG. 1 illustrates two multi-story buildings 1 and 2 which are connected to the same community antenna system 3. In the case of FIG. 1, an antenna 4 of the community antenna system receives television and/or radio signals transmitted via the radio path and supplies them by means of cables 5 and branching devices 10 to antenna connections in the buildings 1 and 2 to which, e.g., TV receivers 6 can be connected. Alternatively, the community antenna system may as a whole comprise a cable network in which case the antenna 4 will not be needed, but the cabling 5 will reach as far as the station broadcasting TV programs. Transmitters included in the community antenna system, such as filters and -amplifiers, are not depicted in FIG. 1.

Telecommunication signals between a base station BS and subscriber units 7 are also transmitted by the community antenna system 3. The base station BS shown in FIG. 1 is in other parts as a conventional base station of the GSM system except that its transmitter TX and receiver RX use different frequency channels than normally used. These frequency channels will in the following be referred to as transmission frequencies and they have been selected in view of the data transmission channel to be used. In the case of FIG. 1, the data transmission channel consists of a connection cable 8 and a cable 5 of the community antenna system, whereby the frequency channels of the transmitter and the receiver can be between 5 to 50 MHz or 400 to 750 MHz, for example. The frequencies mentioned above, as well as the frequencies shown in FIG. 2, are naturally only given shown by way of example. The transmission and reception of the same logical channel takes place by utilizing different frequency channels. In addition to the transmitter TX and the receiver RX shown in FIG. 1, the base station may have several other conventional transmitters and receivers that are operating on radio channels.

The base station BS is connected to the community antenna system 3 by the connection cable 8 and a branching device 9. When needed, the connection cable 8 can be replaced by another data transmission channel, such as a radio link.

Repeaters 11 are connected to the community antenna connections of buildings 1 and 2. The repeaters 11 may be specific for a building, a story or a flat. The repeaters 11 are connected via the radio path through antennas to the subscriber units 7 of the cellular radio system. Thus the repeaters 11 receive transmission frequency signals transmitted via the community antenna system 3 from the base station, transfer the received signals to radio frequencies and forward them to the subscriber units. Similarly, the repeaters 11 receive radio frequency signals from subscriber units 7, transfer them to the transmission frequency and forward them via the community antenna system 3 to the base station BS.

The repeaters 11 preferably use a very low transmission power when transmitting radio signals to the subscriber units 7. Therefore, their coverage area is relatively small, whereby radio cells will become small. This makes possible, for example, the same radio channels and/or time slots to be used in different storys of the same building, if it is a question of a frequency (FDMA-Frequency Division Multiple Access) and/or time division (TDMA-Time Division Multiple Access) cellular radio system without the repeaters and subscriber units using the same logical channel disturbing one another. This will increase the traffic capacity of the cellular radio system.

Figure 2:
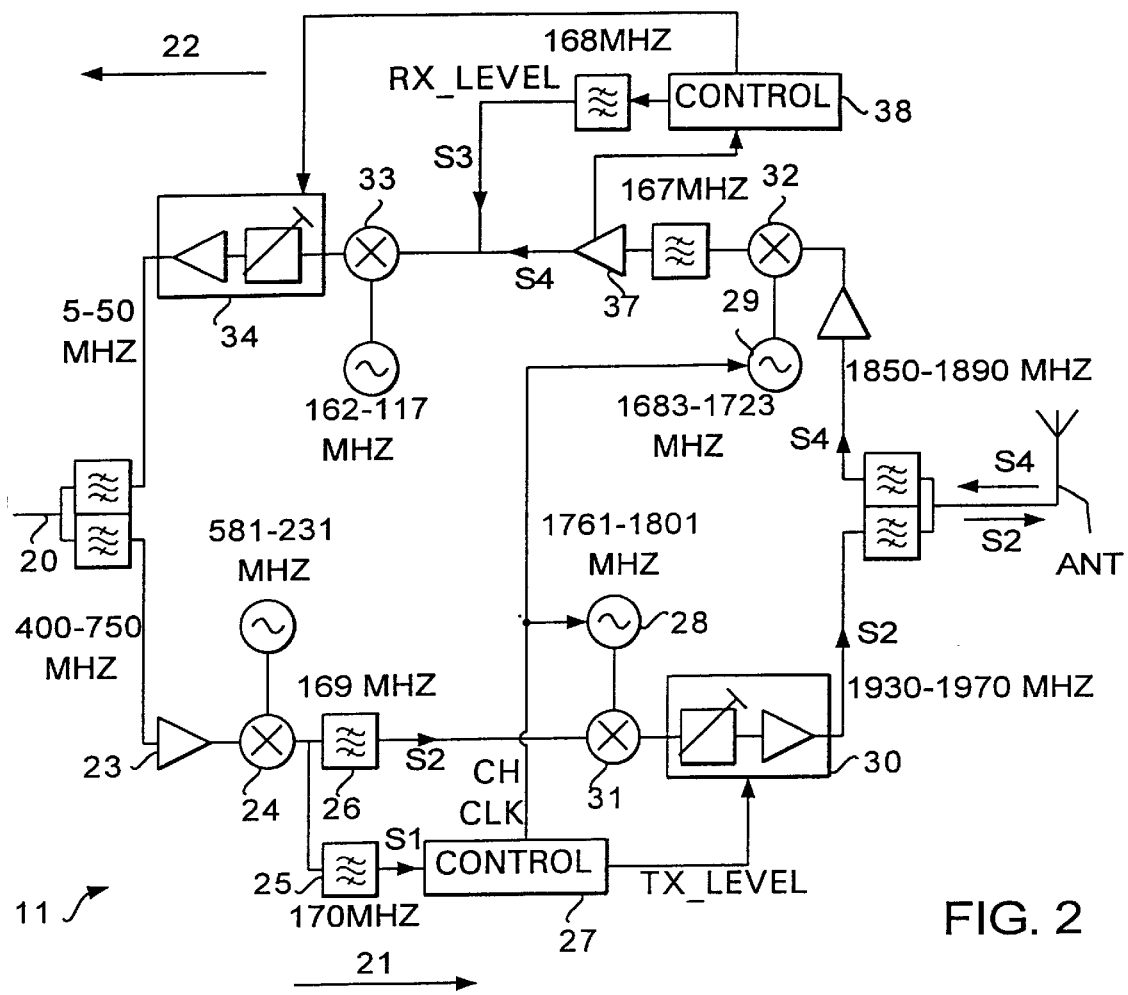
FIG. 2 illustrates a first preferred embodiment of the repeater according to the invention.

FIG. 2 illustrates a first preferred embodiment of the repeater according to the invention. The repeater 11 shown in FIG. 2 comprises a connection unit 20 for connecting the repeater to the connection of the community antenna system and an antenna ANT by means of which the repeater is in contact with the subscriber units of the cellular radio system.

The transmission frequency signals received from the base station are filtered and supplied to an amplifier 23 in a first signal processing branch 21. The output of the amplifier 23 is connected to a mixer 24 by means of which the signals are transferred to an intermediate frequency for separating a first control signal S1 and signals S2 to be repeated from one another with filters 25 and 26. The control signal Si is supplied to a control unit 27 which as a response to the control signal S1 produces a clock signal CLK and control signals CH (which transmits the frequency channels) for oscillators 28 and 29, and a control signal TX_LEVEL for adjustment means 30.

The signals S2 to be repeated are supplied from the filter 26 to a mixer 31 that transfers the signals S2 by means of the oscillator 28 to the radio channel designated by the control signal S1. The radio frequency signals are supplied to the adjustment means 30 with which the signals are amplified (or attenuated) to the signal level that is determined for them by the control signal S1. The amplified signals are supplied from the adjustment means 30 further to the antenna ANT.

The radio frequency signals received from the subscriber units with the antenna ANT are supplied to a second signal processing branch 22 in which the received signals are amplified and supplied to a mixer 32 with which the radio frequency signals are transferred to a predetermined intermediate frequency after which the intermediate frequency signals S4 are filtered.

An AGC amplifier 37 (Automatic Gain Control) takes samples of the filtered signals on the basis of which a control unit 38 produces a control signal S3 indicating the signal level RX_LEVEL of the received signals. As the signals are filtered before the samples are taken, only the signal level of the signals to be repeated will have an effect on the measuring result. An amplifier 37 also amplifies the signals S4 to a predetermined level.

The control signals S3 and S4 are added after which the added signals are transferred with a mixer 33 to a predetermined transmission level and thereafter the transmission frequency signals are amplified (or attenuated) with adjusting means 34 before they are supplied via the connection unit 20 to the base station by using the community antenna system. The control unit 38 controls the adjusting means 34 in such a manner that the signal level of the signals transmitted to the base station through the community antenna system is constant, and essentially greater than the level of disturbances present in the cable of the community antenna system.

Figure 3:
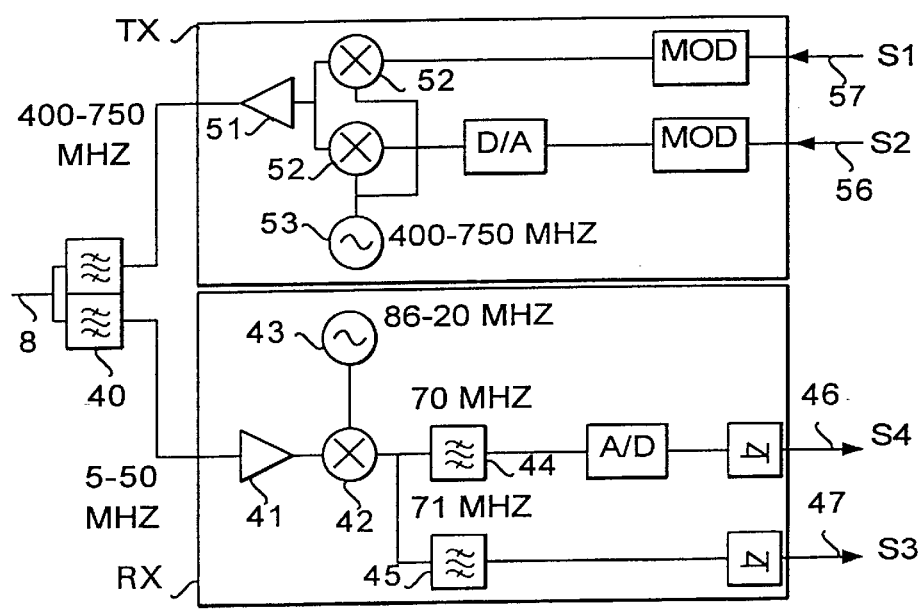
FIG. 3 illustrates a first preferred embodiment of the base station according to the invention.

FIG. 3 illustrates a first preferred embodiment of the base station according to the invention. The block diagram of FIG. 3 shows the base station BS shown in FIG. 1 in more detail, the base station being connected through the cable 8 to the community antenna system. The transmitter TX and the receiver RX do not, in the case of FIG. 3, transmit radio frequency signals, but frequency channels, which are illustrated in FIG. 3 by way of example, are selected for the transmitter TX and the receiver RX as being suitable to be employed in the community antenna system.

The signals to be received via the cable 8, are separated by a duplex filter 40 from the signals to be transmitted. After this, the signals to be received are supplied via a preamplifier 41 of the receiver RX to a mixer means 42 which is responsive to a local oscillator 43 and with which the signals are transferred to a predetermined intermediate frequency. The intermediate frequency signals are channel filtered with filters 44 and 45, after which, the signals are detected, decoded, etc., in a manner known per se.

The receiver RX in FIG. 3 thus comprises two outputs 46 and 47. A signal S4 is received from the output 46, that is, a signal related to the ongoing telecommunication connections (speech, etc.). A control signal is received from the output 47 by means of which the base station calculates the signal level of the received signal (RSSI-Received Signal Strength Indication), for example. The information is used for an operation connected to handovers, for example. By means of the control signal S3, various alarms are also preferably transmitted to the base station, e.g. concerning malfunctions in the repeater connected to the community antenna system.

Correspondingly, the base station shown in FIG. 3 comprises two inputs 56 and 57. A payload signal S2 (speech, etc.) related to telecommunication connections is supplied to the input 56. A control signal S1 is supplied to the input 57 with which signal information concerning the transmission level, the radio channel (CH) and a clock signal (CLK) is transmitted to the repeater. The payload signal S2 and similarly, the control signal S3 are encoded and modulated after which the signals are mixed up separately with a mixer 52 by using a local oscillator 53. After this, the signals S1 and S2 are amplified with a mutual power amplifier 51 and the amplified signals are supplied via the duplex filter 40 to the cable 8.

It is to be understood that the above specification and the figures related thereto are only intended to illustrate the present invention. Therefore the utilization of the repeater according to the invention is not restricted inside buildings, but it can of course be used anywhere where there is a connection to a community antenna system. The different variations and modifications of the invention will be apparent to those skilled in the art without deviating from the scope and spirit of the invention presented in the appended claims.

I claim:

1. A cellular radio system which comprises:
   a community antenna system for distributing television signals to antenna connections, said community antenna system including cables and branching devices;
   a plurality of subscriber units;
   a base station comprising:
      means for establishing a telecommunication connection to the subscriber units of the system,
      a transmitter having means for supplying telecommunication signals to the community antenna system, and
      a receiver having means for receiving telecommunication signals transmitted from the community antenna system; and
   a repeater which comprises:
      a connection unit for connecting the repeater to the community antenna system, and
      antenna means for establishing a telecommunication connection to the subscriber units by radio frequency signals at a radio frequency, whereby the repeater is arranged to transmit telecommunication signals between the subscriber units and the community antenna system,
      means for receiving a predetermined control signal from the base station,
      mixer means for transferring signals to be repeated, supplied by the base station, to a radio channel indicated by said predetermined control signal, and
      adjustment means for adjusting a signal level of the radio frequency signals to a level indicated by said predetermined control signal.

2. The system according to claim 1, wherein:
   the repeater further comprises signal processing means for transferring transmission frequency signals received at a transmission frequency from the community antenna system to said radio frequency before they are forwarded to the antenna means, and for transferring the radio frequency signals received with the antenna means to said transmission frequency before they are forwarded to the community antenna system.

3. A repeater for repeating telecommunication signals between a base station of a cellular radio system and a subscriber unit, the repeater comprises:
   a connection unit which comprises means for connecting the repeater to a community antenna system for distributing television signals to antenna connections, said community antenna system including cables and branching devices, and having a signal transmission connection to the base station;
   antenna means for connecting the repeater via a signal transmission connection to the subscriber unit by radio frequency signals at a radio frequency; and
   means for signal processing including:
      a first signal processing branch for transferring signals transmitted by the community antenna system to said radio frequency and for supplying said radio frequency signals via said antenna means to the subscriber unit;
      a second signal processing branch for transferring said radio frequency signals received from said antenna means to a predetermined transmission frequency as transmission frequency signals, and for supplying said transmission frequency signals further via the connection unit to the community antenna system;

means for receiving a first control signal from the base station through said connection unit;

mixer means for transferring radio frequency signals to be repeated, received via said connection unit, to a radio channel indicated by said first control signal; and adjustment means for adjusting a signal level of said radio frequency signals to a level indicated by said first control signal.

4. The repeater according to claim 3, wherein:

said first signal processing branch comprises signal processing means for separating said first control signal from signals received from the base station via said connection unit; and said second signal processing branch comprises:

second signal processing means for measuring the signal level of signals transmitted from the subscriber unit via said antenna means and for producing a second control signal indicating a measuring result;

second mixer means for transferring signals received from the subscriber unit, and the second control signal, to a predetermined transmission frequency as transmission frequency signals; and second adjustment means for adjusting the signal level of said transmission frequency signals to a predetermined level.

5. The repeater according to claim 4, further comprising:

means for producing a clock signal from said first control signal (S1).

6. A base station of a cellular radio system which comprises:

means for connecting said base station to a community antenna system for distributing television signals to antenna connections, said community antenna system including cables and branching devices, a transmitter arranged to transmit telecommunication signals via the community antenna system to subscriber units, a receiver arranged to receive telecommunication signals transmitted via the community antenna system from the subscriber units, said transmitter comprising means for supplying a predetermined control signal to the community antenna system, the control signal indicating a radio channel on which and a transmission power at which said telecommunication signals transmitted by the transmitter should be transmitted via a radio path to the subscriber units.

7. The base station according to claim 6, further comprising:

means for receiving a second control signal transmitted from the community antenna system, and for calculating the signal level of the received signal for signals received by the receiver on the basis of said second control signals.

* * * * *